(12) United States Patent
Hall et al.

(10) Patent No.: US 9,225,393 B2
(45) Date of Patent: Dec. 29, 2015

(54) SYSTEMS AND METHODS FOR DETERMINING WHETHER A COMPANION COMMUNICATION DEVICE IS BEYOND A PROXIMITY OF A PRIMARY COMMUNICATION DEVICE

(71) Applicant: Broadcom Corporation, Irvine, CA (US)

(72) Inventors: Steven Hall, Olivenhain, CA (US); Ash Kapur, Frederick, MD (US); Sherry Wang Smith, San Diego, CA (US); Robert Castle, Bristol (GB)

(73) Assignee: Broadcom Corporation, Irvine, CA (US)

( * ) Notice: Subject to any disclaimer, the term of this patent is extended or adjusted under 35 U.S.C. 154(b) by 633 days.

(21) Appl. No.: 13/625,794

(22) Filed: Sep. 24, 2012

(65) Prior Publication Data

US 2014/0087655 A1   Mar. 27, 2014

(51) Int. Cl.
  *H04B 5/00* (2006.01)
(52) U.S. Cl.
  CPC ............ *H04B 5/0056* (2013.01); *H04B 5/0075* (2013.01)
(58) Field of Classification Search
  CPC .............. H04B 5/0056; H04B 5/0075; H04M 1/72516
  USPC ........................................................ 455/421
  See application file for complete search history.

(56) References Cited

U.S. PATENT DOCUMENTS

| | | | | |
|---|---|---|---|---|
| 7,099,627 | B2 * | 8/2006 | Turner et al. | 455/67.11 |
| 8,244,181 | B2 * | 8/2012 | Shuo | 455/41.2 |
| 2010/0015917 | A1 * | 1/2010 | Symons et al. | 455/41.1 |
| 2011/0147451 | A1 * | 6/2011 | Bakshi | 235/379 |
| 2012/0262338 | A1 * | 10/2012 | Hills | 342/386 |
| 2013/0005247 | A1 * | 1/2013 | Awad | 455/41.1 |
| 2013/0074170 | A1 * | 3/2013 | Lo et al. | 726/7 |

FOREIGN PATENT DOCUMENTS

WO   2008/050085 A1   5/2008

* cited by examiner

*Primary Examiner* — Lewis West
(74) *Attorney, Agent, or Firm* — McDermott Will & Emery LLP

(57) ABSTRACT

Systems and methods for determining whether a companion communication device is beyond a proximity of a primary communication device are provided. In some aspects, a system includes an analysis module configured to determine whether a wireless transaction between the primary communication device and the companion communication device is at a conclusion. The system also includes a communications module configured to emit a sensing signal based on the determination of whether the transaction is at the conclusion. The sensing signal is insufficient to elicit a response from the companion communication device. The system also includes a detection module configured to detect a present parameter associated with the emitted sensing signal. The analysis module is configured to determine a parameter change between the present parameter and a reference parameter, and to determine whether the companion communication device is beyond the proximity of the primary communication device based on the parameter change.

21 Claims, 6 Drawing Sheets

SYSTEMS AND METHODS FOR DETERMINING WHETHER A COMPANION COMMUNICATION DEVICE IS BEYOND A PROXIMITY OF A PRIMARY COMMUNICATION DEVICE

FIELD

The subject technology generally relates to communication devices and, in particular, relates to systems and methods for determining whether a companion communication device is beyond a proximity of a primary communication device.

BACKGROUND

Near field communication (NFC) allows for the wireless communication of data between devices that are in close proximity to one another. NFC devices use magnetic induction to communicate with one another. For example, a first NFC device may emit an electric current that creates a magnetic field, which in turn bridges the physical space between the first NFC device and a second NFC device. This magnetic field may be received by an antenna of the second NFC device, where it may be turned back into electrical impulses to communicate data such as an identification number, status information, or any other information.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, well-known structures and techniques have not been shown in detail so as not to obscure the subject technology.

An NFC device, for example, may be a mobile phone, a camera, a laptop computer, a netbook computer, a tablet computer, a personal digital assistant, a portable gaming system, a global positioning system, a point-of-sale system, an NFC-enabled card, a device in card emulation mode, and/or other suitable electronic instrument that may be used to communicate wirelessly with other devices. An NFC device typically operates in the 13.56 megahertz radiofrequency spectrum, and can, for example, transfer data at various speeds such as at 106 kilobits per second (kbit/s), 212 kbit/s, 424 kbit/s, or 848 kbit/s.

Furthermore, an NFC device can operate in an initiator mode of operation (e.g., an initiator) or in a target mode of operation (e.g., a target). An initiator, for example, may be a reader that generates a radio frequency (RF) signal to initiate a wireless transaction with a target. The target, for example, may be a tag that enters into the wireless transaction with the initiator by responding to the RF signal. The target may be a passive device that harvests power from the RF signal to power itself in order to respond to the initiator. The wireless transaction may comprise an exchange of data between the two devices to carry out one or more objectives indicated by a user of either device. For example, transactions between the two NFC devices can include conducting monetary payments, checking in the user at various locations, scanning items to retrieve information, transferring files between the two NFC devices, and/or other suitable actions. Once a transaction is complete, however, the target may still be within the proximity of the initiator. As a result, the initiator must determine whether the target has been removed from its proximity so that the initiator will not mistake the current target as a new target to communicate with.

Figure 1:
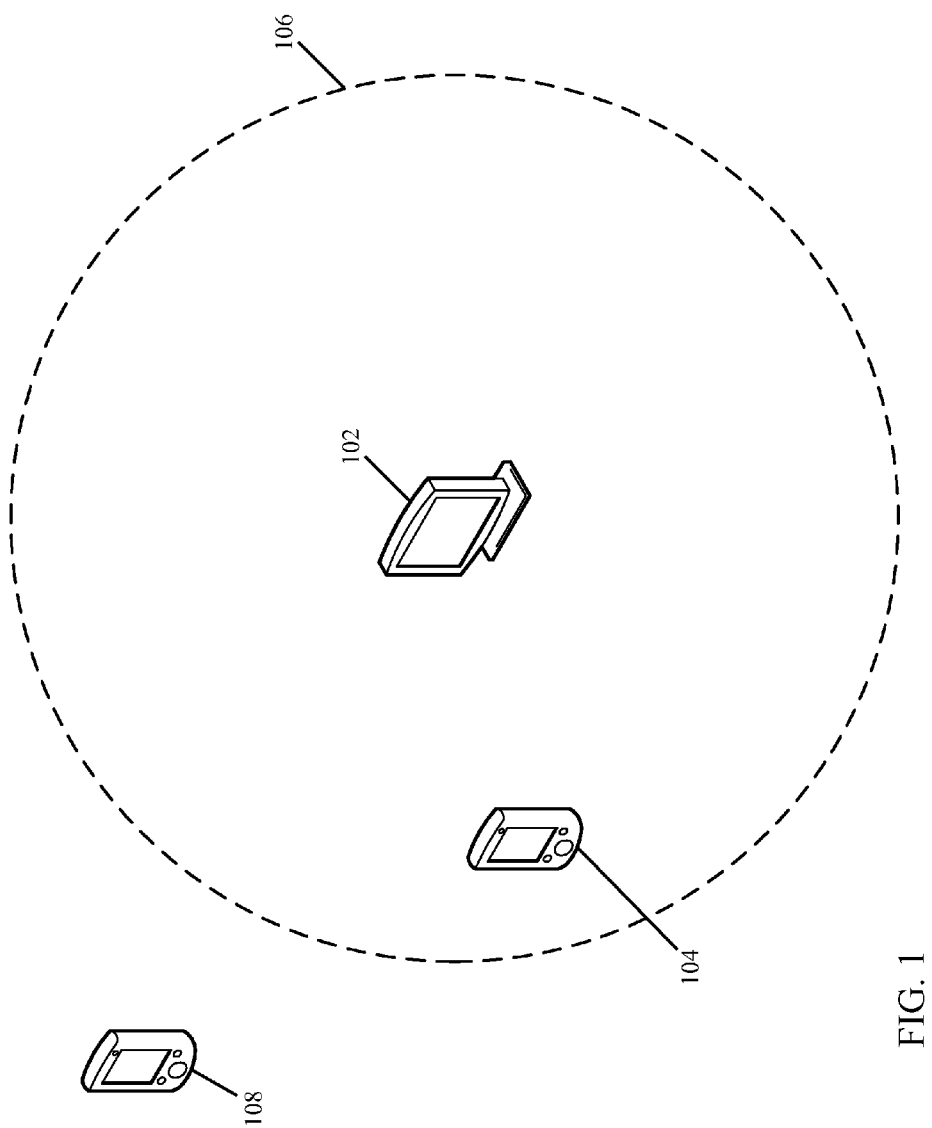
FIG. 1 illustrates a primary NFC device as an example of an initiator and a companion NFC device as an example of a target, in accordance with various aspects of the subject technology.

FIG. 1 illustrates primary NFC device 102 as an example of an initiator and companion NFC device 104 as an example of a target, in accordance with various aspects of the subject technology. In particular, primary NFC device 102 is shown as a point-of-sale system, while companion NFC device 104 is shown as a smartphone (e.g., operating in card emulation mode). Primary NFC device 102, for example, may be placed at a customer establishment (e.g., a grocery store, a gasoline station, a restaurant, a department store, etc.). A customer may use companion NFC device 104 to enter into a wireless transaction with primary NFC device 102 for various purposes, such as to conduct monetary payments, to transfer files between the two devices, or to perform some other suitable function. Although companion NFC device 104 is shown as a smartphone that can enter into this type of transaction, companion NFC device 104 may be another suitable electronic device, such as an NFC-enabled credit card or key fob.

Line 106 in FIG. 1 illustrates the range of communication of primary NFC device 102, which can be several centimeters (e.g., up to 4 centimeters). However, according to certain aspects, this range can be greater than or fewer than several centimeters. For example, the range of communication can be up to 1 meter. Companion NFC device 104 may also have the same or a similar range of communication. In this regard, the area within line 106 may be an area in which primary NFC device 102 and companion NFC device 104 are able to communicate wirelessly with one another. Thus, this area may be considered the proximity of primary NFC device 102. As shown in FIG. 1, companion NFC device 104 is within the proximity of primary NFC device 102. Primary NFC device 102 can therefore enter into the wireless transaction with companion NFC device 104, as described above.

After the transaction between primary NFC device 102 and companion NFC device 104 is complete, however, companion NFC device 104 may continue to remain within the proximity of primary NFC device 102. In such a situation, primary NFC device 102 still needs to keep track of companion NFC device 104, and determine whether companion NFC device 104 has been removed from its proximity. Otherwise, primary NFC device 102 may mistake companion NFC device 104 to be a new NFC device to communicate with, and consequently attempt to establish a new wireless transaction with companion NFC device 104 even though the previous transaction between companion NFC device 104 and primary NFC device 102 has already been completed. Furthermore, primary NFC device 102 may be wasting resources (e.g., in terms of processing power, time, power generation, etc.) in keeping track of companion NFC device 104 when it could be devoting more of its resources in searching for an actual new companion NFC device to communicate with (e.g., another smartphone such as companion NFC device 108).

Figure 2:
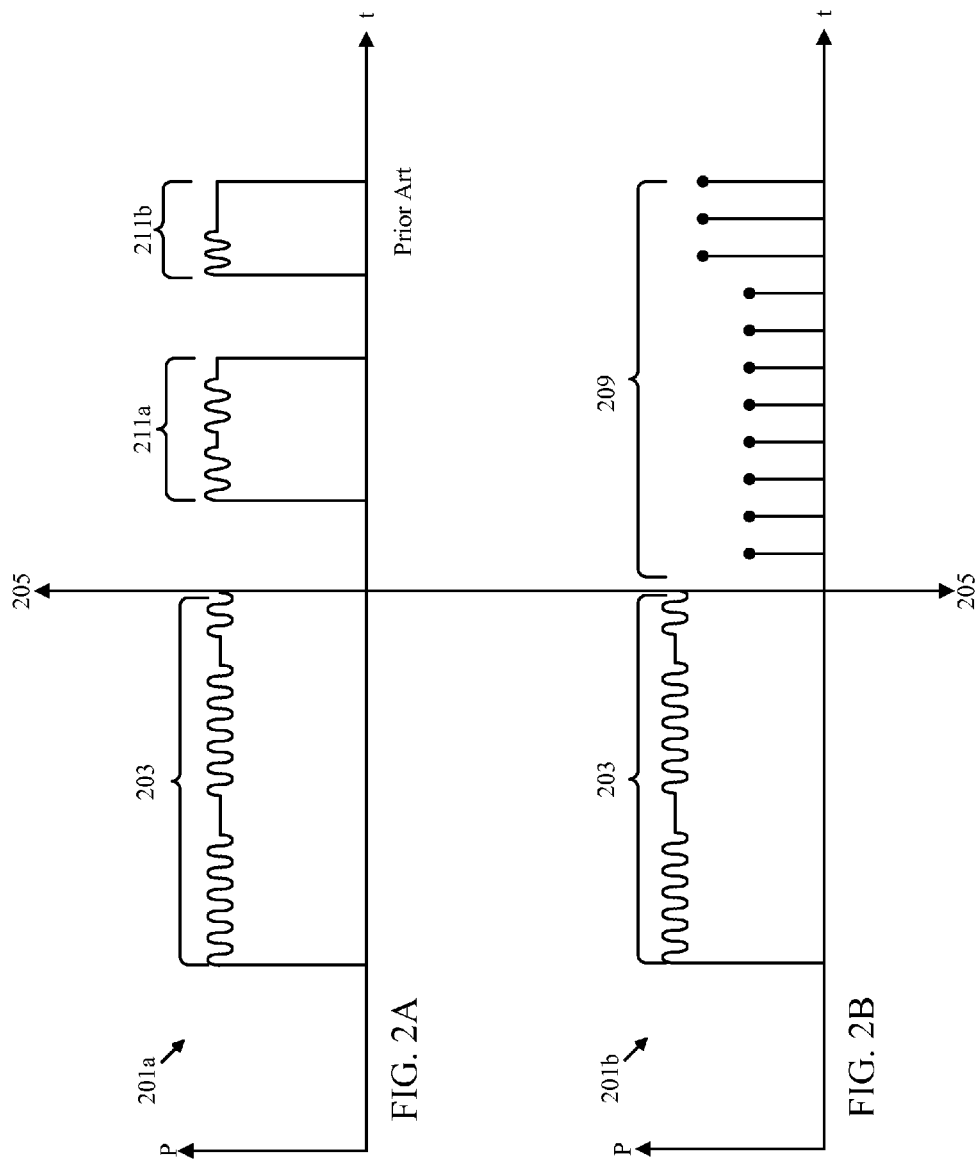
FIG. 2A illustrates a profile of one or more signals generated by a primary NFC device during and after a transaction with a companion NFC device.
FIG. 2B illustrates a profile of one or more signals generated by a primary NFC device during and after a transaction with a companion NFC device, in accordance with various aspects of the subject technology.

According to one conventional approach, after a transaction between primary NFC device 102 and companion NFC device 104 is completed, primary NFC device 102 can determine if companion NFC device 104 is beyond its proximity by polling companion NFC device 104 (e.g., sending companion NFC device 104 a polling signal and determining if companion NFC device 104 is beyond its proximity based on whether companion NFC device 104 responds). FIG. 2A illustrates profile 201a of one or more signals generated by primary NFC device 102 during and after the transaction, according to a polling approach. Power is represented along the vertical axis in FIG. 2A, while time is represented along the horizontal axis in FIG. 2A. Interval 203 represents a period of time in which primary NFC device 102 and companion NFC device 104 are engaged in the transaction. For example, during interval 203, primary NFC device 102 may transmit one or more signals to companion NFC device 104. The one or more signals may be modulated onto a carrier wave (e.g., having a frequency of approximately 13.56 megahertz) to convey various information to companion NFC device 104. Any suitable analog or digital modulation technique may be used for the modulation, including, but not limited to, amplitude modulation (AM), frequency modulation (FM), phase modulation (PM), phase shift keying (PSK), frequency shift keying (FSK), amplitude shift keying (ASK), and quadrature amplitude modulation (QAM). Companion NFC device 104 may operate on the power provided by the one or more signals, and respond to primary NFC device 102 by modulating its own signals to convey other information back to primary NFC device 102 (e.g., credit card information for completing a monetary payment).

Line 205 marks a point in time in which the transaction between primary NFC device 102 and companion NFC device 104 is completed. At this point, primary NFC device 102 does not necessarily know if companion NFC device 104 has been physically removed from its proximity. In this regard, primary NFC device 102 may poll companion NFC device 104. If companion NFC device 104 fails to respond to the poll, then primary NFC 102 may determine that companion NFC device 104 has been removed from its proximity. However, since companion NFC device 104 may operate on the power provided by the one or more signals generated by primary NFC device 102, the one or more signals generated after the transaction need to continue to provide at least enough power such that companion NFC device 104 can respond to the poll.

For example, under the polling approach in FIG. 2A, after the completion of the transaction, primary NFC device 102 may poll companion NFC device 104 by periodically sending companion NFC device 104 one or more polling signals sufficient to power companion NFC device 104 so that companion NFC device 104 can respond. For example, intervals 211a and 211b represent periods of time in which primary NFC device 102 polls companion NFC device 104. If companion NFC device 104 responds (e.g., as shown in interval 211a), primary NFC device 102 may determine that companion NFC device 104 is still within its proximity. In such a situation, primary NFC device 102 may continue polling companion NFC device 104 until companion NFC device 104 fails to respond. If companion NFC device 104 fails to respond (e.g., as shown in interval 211b), primary NFC device 102 may determine that companion NFC device 104 has been removed from its proximity. After such a determination, primary NFC device 102 can devote more of its resources in looking for a new companion NFC device to communicate with and/or stop transmitting signals with a high level of power (e.g., sufficient to power companion NFC device 104).

However, the polling after the transaction causes primary NFC device 102 to waste a large amount of power simply to determine whether or not companion NFC device 104 is still within its proximity. This can be especially troublesome under polling if companion NFC device 104 remains within the proximity of primary NFC device 102 for an extended period of time after the completion of the transaction. The polling may be a long process, since it involves primary NFC device 102 waiting for either a response or a lack of a response from companion NFC device 104. Thus, if primary NFC device 102 were to poll companion NFC device 104 for an extended period of time, primary NFC device 102 may not be able to devote more of its resources in looking for a new companion NFC device to communicate with, which can cause a user to experience long delays when switching from an old companion NFC device 104 to a new companion NFC device.

According to various aspects of the subject technology, systems and methods are provided for determining whether companion NFC device 104 is beyond a proximity of primary NFC device 102 in a quick and power-efficient manner. In some aspects, at a conclusion of a transaction between primary NFC device 102 and companion NFC device 104, primary NFC device 102 can determine whether companion NFC device 104 is beyond its proximity by emitting a sensing signal that companion NFC device 104 is not required to respond to. Since the presence of companion NFC device 104 may affect this sensing signal, primary NFC device 102 can determine whether companion NFC device 104 has been removed from its proximity based on changes that are detected in the sensing signal or in other parameters associated with the sensing signal without requiring a response from companion NFC device 104. As a result, the sensing signal does not have to provide a high level of power (e.g., sufficient to power companion NFC device 104). Thus, by detecting changes in the sensing signal or in other parameters associated with the sensing signal, primary NFC device 102 can quickly determine whether companion NFC device 104 is beyond its proximity using less resources compared to polling.

FIG. 2B illustrates profile 201b of one or more signals generated by primary NFC device 102 during and after the transaction, in accordance with various aspects of the subject technology. Power is represented along the vertical axis in FIG. 2B, while time is represented along the horizontal axis in FIG. 2B. Just as in FIG. 2A, interval 203 represents a period of time in which primary NFC device 102 and companion NFC device 104 are engaged in the transaction. Furthermore, just as in FIG. 2A, line 205 marks a point in time in which the transaction between primary NFC device 102 and companion NFC device 104 is completed. FIG. 2B illustrates an example of sensing signal 209 that primary NFC device 102 may emit to determine if companion NFC device 104 is beyond its proximity. As shown, sensing signal 209 comprises a plurality of short pulses. Compared to the polling in FIG. 2A, primary NFC device 102 in FIG. 2B does not expend as much power to detect whether or not companion NFC device 104 has been removed from its proximity. This is because sensing signal 209 does not have to elicit a response from companion NFC device 104, and therefore may provide less power than the polling signals. In particular, sensing signal 209 may be insufficient to power companion NFC device 104.

Furthermore, compared to polling (wherein primary NFC device 102 has to wait for a response or a lack of a response from companion NFC device 104 to determine if companion NFC device 104 has been removed), primary NFC device 102 in FIG. 2B can quickly determine if companion NFC device 104 has been removed from its proximity simply by detecting a change in sensing signal 209 or in other parameters associated with sensing signal 209. For example, since the presence of companion NFC device 104 causes a load on primary NFC device 102, the load seen at an antenna of primary NFC device 102 may decrease if companion NFC device 104 is removed from the proximity of primary NFC device 102. Furthermore, since companion NFC device 104 consumes power from sensing signal 209, the power of sensing signal 209 may increase if companion NFC device 104 is removed from the proximity of primary NFC device 102 (e.g., as illustrated by the last three pulses shown in FIG. 2B). In some aspects, the phase and/or amplitude of sensing signal 209 may change if companion NFC device 104 is removed from the proximity of primary NFC device 102. By detecting the change in sensing signal 209 or in other parameters associated with sensing signal 209, primary NFC device 102 can quickly determine whether companion NFC device 104 is beyond the proximity of primary NFC device 102 using less resources compared to polling (e.g., in terms of processing power, time, power generation, etc.). Thus, primary NFC device 102 can devote more of its resources in looking for a new companion NFC device to communicate with, thereby allowing a user to rapidly switch between different companion NFC devices.

Figure 3:
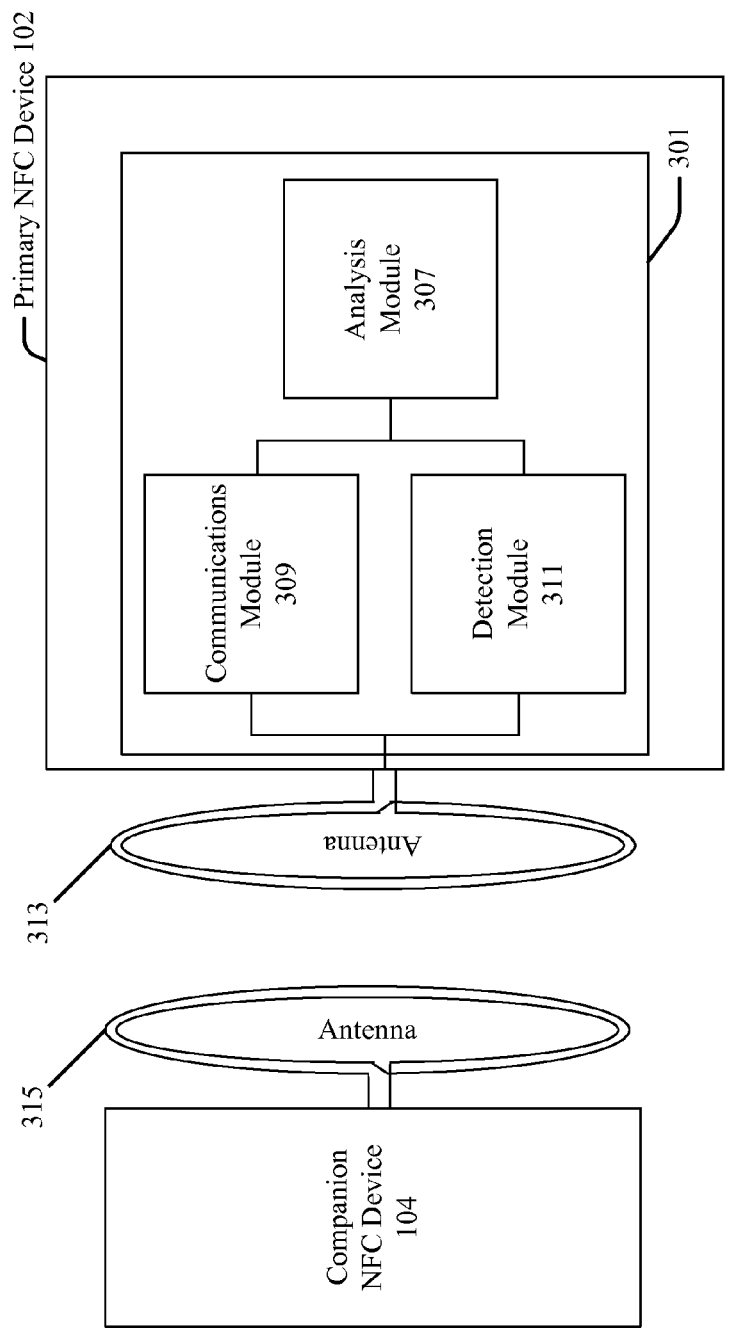
FIG. 3 illustrates a detailed view of a primary NFC device and a companion NFC device, in accordance with various aspects of the subject technology.

FIG. 3 illustrates a detailed view of primary NFC device 102 and companion NFC device 104, in accordance with various aspects of the subject technology. Primary NFC device 102 includes antenna 313, while companion NFC device 104 includes antenna 315. Primary NFC device 102 and companion NFC device 104 communicate wirelessly with one another using antennas 313 and 315. Antennas 313 and 315, for example, may each include a coil, a matching circuit, a tuning circuit, and/or other components for receiving and transmitting signals.

Primary NFC device 102 comprises system 301, which determines whether companion NFC device 104 is beyond a proximity of primary NFC device 102. System 301 comprises analysis module 307, communications module 309, and detection module 311. These modules are in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 4:
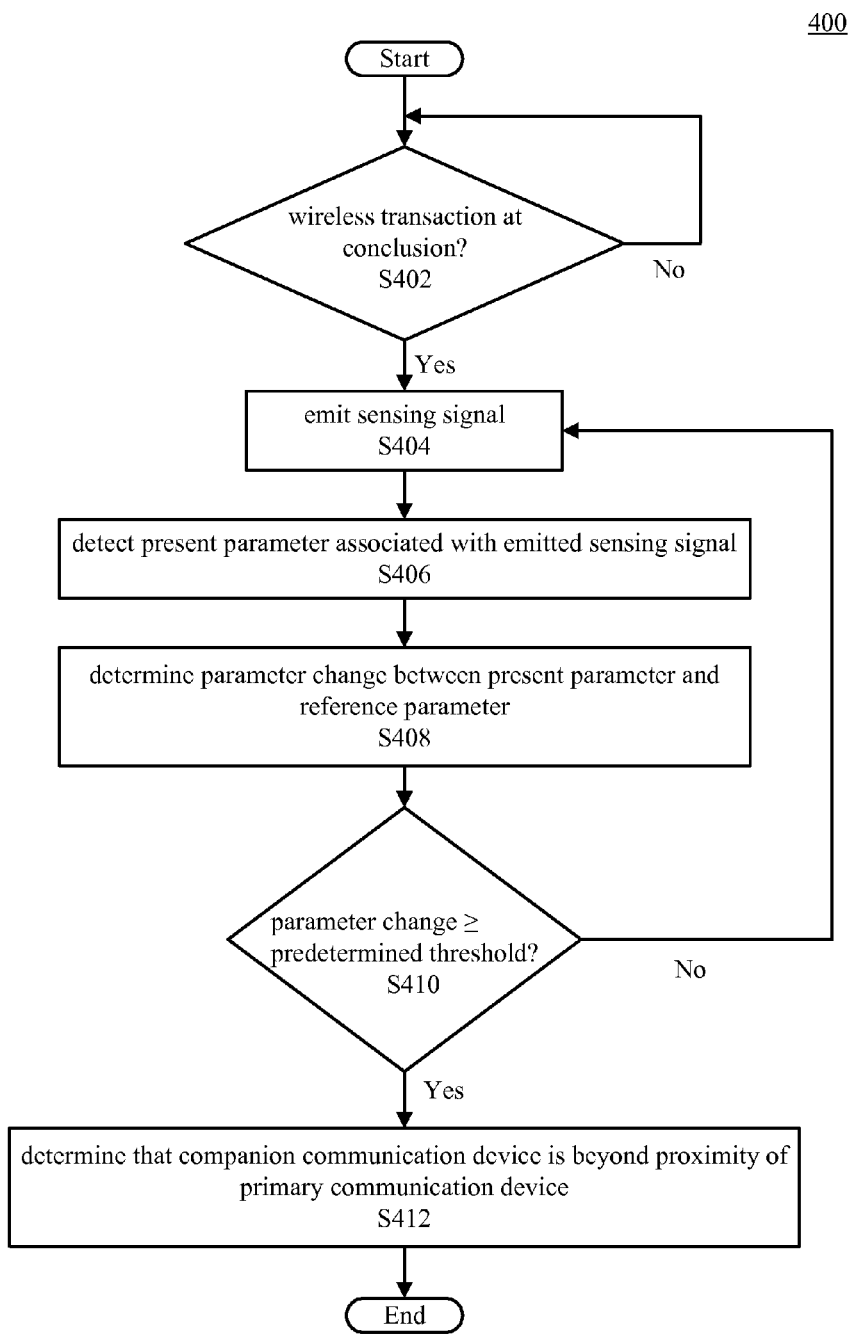
FIG. 4 illustrates an example of a method for determining whether a companion NFC device is beyond the proximity of a primary NFC device, in accordance with various aspects of the subject technology.

FIG. 4 illustrates an example of method 400 for determining whether companion NFC device 104 is beyond the proximity of primary NFC device 102, in accordance with various aspects of the subject technology. System 301, for example, may be used to implement method 400. However, method 400 may also be implemented by systems having other configurations. Although method 400 is described herein with reference to the examples shown in FIGS. 1, 2B, 3, and 5, method 400 is not limited to these examples.

According to step S402, analysis module 307 determines whether a wireless transaction between primary NFC device 102 and companion NFC device 104 is at a conclusion (e.g., the transaction is completed or is in the final stages of being complete). For example, analysis module 307 may determine whether the transaction is at a conclusion by determining when the user terminates the transaction and/or when the transaction times out. In some aspects, analysis module 307 may determine whether the transaction is at a conclusion by determining if an objective of the transaction has been completed or if it has failed. In one example, an objective of the wireless transaction between companion NFC device 104 and primary NFC device 102 is to complete a monetary payment (e.g., companion NFC device 104 is a smartphone that provides credit card information and other suitable information to primary NFC device 102, which is a point-of-sale system, to complete a purchase). Analysis module 307 may determine that this transaction is at a conclusion if the monetary payment is completed or if it has failed.

Figure 5:
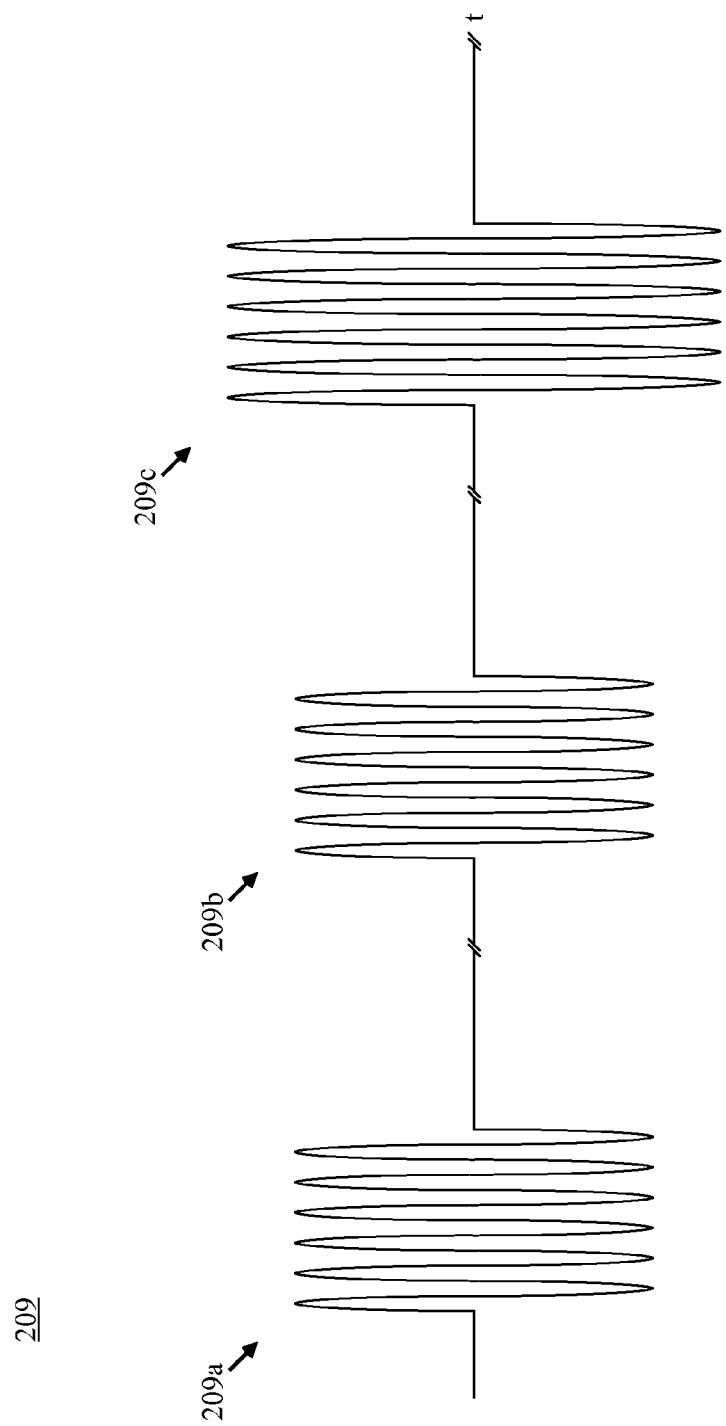
FIG. 5 illustrates a detailed view of a sensing signal, in accordance with various aspects of the subject technology.

If the transaction is not determined to be at a conclusion, then analysis module 307 may repeat step S402 or wait a certain period of time before repeating step S402. According to steps S402 and S404, if the transaction is determined to be at a conclusion, communications module 309 emits, via antenna 313, sensing signal 209. As discussed above, sensing signal 209 is shown in FIG. 2B as comprising a plurality of pulses (e.g., magnetic field pulses). FIG. 5 illustrates a detailed view of sensing signal 209, in accordance with various aspects of the subject technology. As shown in FIG. 5, sensing signal 209 comprises pulses 209a, 209b, and 209c. Because primary NFC device 102 emits pulses rather than a continuous signal, power may be conserved when determining whether companion NFC device 104 is beyond the proximity of primary NFC device 102. For example, a pulse width of each of the plurality of pulses may be between 20 and 100 microseconds. However, the pulse width may be greater than or less than this range depending on the type of device that primary NFC device 102 and companion NFC device 104 are, the type of transaction that primary NFC device 102 and companion NFC device 104 are engaged in, the environment in which primary NFC device 102 and companion NFC device 104 are communicating, the presence of noise, and/or other suitable factors.

As discussed above, sensing signal 209 is insufficient to elicit a response from companion NFC device 104. For example, sensing signal 209 is insufficient to power companion NFC device 104, which allows primary NFC device 102 to conserve power when determining whether companion NFC device 104 is beyond the proximity of primary NFC device 102. The power of sensing signal 209 may be less than a minimum power needed to operate companion NFC device 104. In some aspects, the power of sensing signal 209 is less than a minimum power needed to wake up companion NFC device 104. For example, a current amplitude of sensing signal 209 may be between 60 and 200 milliamps. However, the current amplitude of sensing signal 209 may be greater than or less than this range depending on the type of device that primary NFC device 102 and companion NFC device 104 are, the type of transaction that primary NFC device 102 and companion NFC device 104 are engaged in, the environment in which primary NFC device 102 and companion NFC device 104 are communicating, the presence of noise, and/or other suitable factors.

Furthermore, unlike systems that rely on polling to determine whether companion NFC device 104 is beyond the proximity of primary NFC device 102, communications module 309 may refrain from polling companion NFC device 104 if the transaction is determined to be at the conclusion. For example, communications module 309 may refrain from polling companion NFC device 104 in response to analysis module 307 determining that the transaction is at the conclusion. Such polling, for example, may comprise transmitting a polling signal to companion NFC device 104 and detecting a response from companion NFC device 104 based on the transmitted polling signal. Unlike sensing signal 209, the polling signal is sufficient to power companion NFC device 104.

Although communications module 309 is described above as emitting sensing signal 209 if the transaction is determined to be at the conclusion, communications module 309 may emit sensing signal 209 in response to other events. For example, according to certain aspects, communications module 309 may emit sensing signal 209 in response to primary NFC device 102 refraining from polling companion NFC device 104. In some aspects, communications module 309 is configured to emit sensing signal 209 in response to user input received by primary NFC device 102 (e.g., the user of primary NFC device 102 may activate a button of primary NFC device 102 to turn on a screen of primary NFC device 102 or to perform some other function).

As discussed above, the presence of companion NFC device 104 may affect emitted sensing signal 209, and therefore, primary NFC device 102 can determine whether companion NFC device 104 has been removed from its proximity based on changes that are detected in sensing signal 209 or in other parameters associated with sensing signal 209. In this regard, according to step S406, detection module 311 detects a present parameter associated with emitted sensing signal 209. The present parameter, for example, may comprise a present load seen at antenna 313 (e.g., an observed load), a present power of emitted sensing signal 209 (e.g., an observed power), a present phase of emitted sensing signal 209 (e.g., an observed phase), a present amplitude of emitted sensing signal 209 (e.g., an observed amplitude), and/or another parameter useful for determining if companion NFC device 104 is removed from the proximity of primary NFC device 102.

By detecting the present parameter, analysis module 307 may be able to determine whether a parameter change has occurred that would indicate either the presence or lack of a presence of companion NFC device 104 within the proximity of primary NFC device 102. The parameter change, for example, may be calculated as a difference in value between the present parameter and a reference parameter (e.g., a reference against which a comparison is made to determine the parameter change). In this regard, according to step S408, analysis module 307 determines the parameter change between the present parameter and the reference parameter. The reference parameter, for example, may comprise a reference load seen at antenna 313 (e.g., an expected load), a reference power of sensing signal 209 (e.g., an expected power of sensing signal 209), a reference phase of sensing signal 209 (e.g., an expected phase of sensing signal 209), a reference amplitude of sensing signal 209 (e.g., an expected amplitude of sensing signal 209), and/or another parameter useful for determining if companion NFC device 104 is removed from the proximity of primary NFC device 102. In some aspects, the reference parameter may be predetermined. In some aspects, communications module 309 may measure the reference parameter when companion NFC device 104 is within the proximity of primary NFC device 102 (e.g., during the transaction or immediately after the transaction), thereby generating a point of reference for when companion NFC device 104 is within the proximity of primary NFC device 102.

The parameter change may represent at least one of a change in load seen at antenna 313, a change in power of the emitted sensing signal 209, a change in phase of the emitted sensing signal 209, a change in amplitude of the emitted sensing signal 209, and/or a change in other parameters associated with sensing signal 209 that can be used to determine if companion NFC device 104 is beyond the proximity of primary NFC device 102. For example, since the presence of companion NFC device 104 causes a load on primary NFC device 102, the change in the load seen at antenna 313 may be a decrease in the load if companion NFC device 104 is removed from the proximity of primary NFC device 102. Furthermore, since companion NFC device 104 consumes power from sensing signal 209, the change in the power of sensing signal 209 may be an increase in the power if companion NFC device 104 is removed from the proximity of primary NFC device 102. For example, FIG. 5 illustrates the power of sensing signal 209 increasing after companion NFC device 104 is removed from the proximity of primary NFC device 102. As shown in FIG. 5, the power of sensing signal 209 remains substantially the same in pulses 209a and 209b. However, when companion NFC device 104 is removed from the proximity of primary NFC device 102, the power of sensing signal 209 increases, as indicated by an increase in the perceived signal level of pulse 209c. Although the power of sensing signal 209 is described as increasing after companion NFC device 104 is removed from the proximity of primary NFC device 102, the power of sensing signal 209 may in certain instances decrease after companion NFC device 104 is removed. In any event, a change in the power of sensing signal 209, whether an increase or a decrease, may occur after companion NFC device 104 is removed from the proximity of primary NFC device 102.

According to step S410, analysis module 307 compares the parameter change to a predetermined threshold. In some aspects, this threshold represents an amount of parameter change associated with sensing signal 209 that needs to occur in order for companion NFC device 104 to be considered as being beyond the proximity of primary NFC device 102. For example, the predetermined threshold may specify that at least a 10% parameter change (e.g., a change in the load seen at antenna 313, a change in the power of sensing signal 209, a change in the phase of sensing signal 209, and/or a change in the amplitude of sensing signal 209) is needed in order for companion NFC device 104 to be considered as being beyond the proximity of primary NFC device 102. However, the predetermined threshold may be greater than or less than this range depending on the type of device that primary NFC device 102 and companion NFC device 104 are, the type of transaction that primary NFC device 102 and companion NFC device 104 are engaged in, the environment in which primary NFC device 102 and companion NFC device 104 are communicating, the presence of noise, and/or other suitable factors.

According to steps S410 and S404, if the parameter change is less than the predetermined threshold, then communications module 309 may continue emitting sensing signal 209. In such a situation, companion NFC device 104 may be considered as still within the proximity of primary NFC device 102. According to certain aspects, communications module 309 maintains emission of sensing signal 209 until the parameter change is greater than or equal to the predetermined threshold.

According to steps S410 and S412, if the parameter change is greater than or equal to the predetermined threshold, then analysis module 307 determines that companion NFC device 104 is beyond the proximity of primary NFC device 102. Thus, system 301 may implement method 400 to determine whether companion NFC device 104 is beyond the proximity of primary NFC device 102 in a quick and power-efficient manner. Although NFC devices are described herein, the subject technology is equally applicable to other communication devices that communicate wirelessly with one another.

Figure 6:
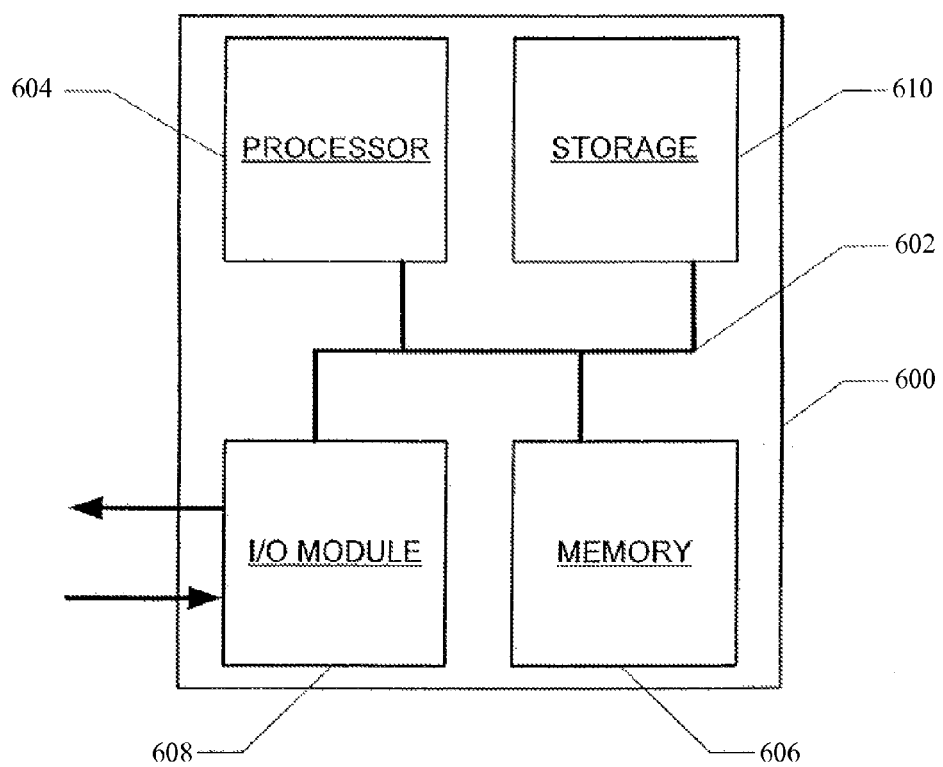
FIG. 6 is a block diagram illustrating components of a controller, in accordance with various aspects of the subject technology.

FIG. 6 is a block diagram illustrating components of controller 600, in accordance with various aspects of the subject technology. Controller 600 comprises processor module 604, storage module 610, input/output (I/O) module 608, memory module 606, and bus 602. Bus 602 may be any suitable communication mechanism for communicating information. Processor module 604, storage module 610, I/O module 608, and memory module 606 are coupled with bus 602 for communicating information between any of the modules of controller 600 and/or information between any module of controller 600 and a device external to controller 600. For example, information communicated between any of the modules of controller 600 may include instructions and/or data. In some aspects, bus 602 may be a universal serial bus. In some aspects, bus 602 may provide Ethernet connectivity.

In some aspects, processor module 604 may comprise one or more processors, where each processor may perform different functions or execute different instructions and/or processes. For example, one or more processors may execute instructions for determining whether a companion communication device is beyond a proximity of a primary communication device, and one or more processors may execute instructions for input/output functions.

Memory module 606 may be random access memory ("RAM") or other dynamic storage devices for storing information and instructions to be executed by processor module 604. Memory module 606 may also be used for storing temporary variables or other intermediate information during execution of instructions by processor 604. In some aspects, memory module 606 may comprise battery-powered static RAM, which stores information without requiring power to maintain the stored information. Storage module 610 may be a magnetic disk or optical disk and may also store information and instructions. In some aspects, storage module 610 may comprise hard disk storage or electronic memory storage (e.g., flash memory). In some aspects, memory module 606 and storage module 610 are both a machine-readable medium.

Controller 600 is coupled via I/O module 608 to a user interface for providing information to and receiving information from an operator of system 301. For example, the user interface may be a cathode ray tube ("CRT") or LCD monitor for displaying information to an operator. The user interface may also include, for example, a keyboard, a mouse, a touchpad, or a touch screen coupled to controller 600 via I/O module 608 for communicating information and command selections to processor module 604.

According to various aspects of the subject technology, methods described herein are executed by controller 600. Specifically, processor module 604 executes one or more sequences of instructions contained in memory module 606 and/or storage module 610. In one example, instructions may be read into memory module 606 from another machine-readable medium, such as storage module 610. In another example, instructions may be read directly into memory module 606 from I/O module 608, for example from an operator of system 301 via the user interface. Execution of the sequences of instructions contained in memory module 606 and/or storage module 610 causes processor module 604 to perform methods to determine whether a companion communication device is beyond a proximity of a primary communication device. For example, a computational algorithm for determining whether a companion communication device is beyond a proximity of a primary communication device may be stored in memory module 606 and/or storage module 610 as one or more sequences of instructions. Information such as the reference parameter, the present parameter, the parameter change, the data exchanged in a transaction between the primary communication device and the companion communication device, details regarding the sensing signal, the predetermined threshold, and/or other suitable information may be communicated from processor module 604 to memory module 606 and/or storage module 610 via bus 602 for storage. In some aspects, the information may be communicated from processor module 604, memory module 606, and/or storage module 610 to I/O module 608 via bus 602. The information may then be communicated from I/O module 608 to an operator of system 301 via the user interface.

One or more processors in a multi-processing arrangement may also be employed to execute the sequences of instructions contained in memory module 606 and/or storage module 610. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 604 for execution. Such a medium may take many forms, including, but not limited to, non-volatile media and volatile media. Non-volatile media include, for example, optical or magnetic disks, such as storage module 610. Volatile media include dynamic memory, such as memory module 606. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for determining whether a companion communication device is beyond a proximity of a primary communication device, the system comprising:
   an analysis module configured to determine whether a wireless transaction between the primary communication device and the companion communication device is at a conclusion;
   a communications module configured to emit a sensing signal based on the determination of whether the transaction is at the conclusion, the sensing signal being insufficient to elicit a response from the companion communication device; and
   a detection module configured to detect a present parameter associated with the emitted sensing signal,
   wherein the analysis module is configured to determine a parameter change between the present parameter and a reference parameter, and
   wherein the analysis module is configured to determine whether the companion communication device is beyond the proximity of the primary communication device based on the parameter change.

2. The system of claim 1, wherein the transaction comprises an exchange of data between the primary communication device and the companion communication device to carry out an objective indicated by a user of the primary communication device.

3. The system of claim 1, wherein the analysis module is configured to determine when a user of the primary communication device terminates the transaction or when the transaction times out.

4. The system of claim 1, wherein the communications module is configured to emit the sensing signal if the transaction is determined to be at the conclusion.

5. The system of claim 1, wherein the sensing signal comprises a plurality of pulses, and wherein a pulse width of each of the plurality of pulses is between 20 and 100 microseconds.

6. The system of claim 1, wherein the reference parameter is predetermined.

7. The system of claim 1, wherein the communications module is configured to measure the reference parameter when the companion communication device is within the proximity of the primary communication device.

8. The system of claim 1, wherein the reference parameter comprises at least one of a reference load seen at an antenna of the primary communication device, a reference power of the sensing signal, a reference phase of the sensing signal, and a reference amplitude of the sensing signal.

9. The system of claim 1, wherein the present parameter comprises at least one of a present load seen at an antenna of the primary communication device, a present power of the emitted sensing signal, a present phase of the emitted sensing signal, and a present amplitude of the emitted sensing signal.

10. The system of claim 1, wherein the communications module is configured to emit the sensing signal in response to user input received by the primary communication device.

11. The system of claim 1, wherein the communications module is configured to refrain from polling the companion communication device based on the conclusion of the transaction.

12. The system of claim 11, wherein the polling comprises:
   transmitting a polling signal to the companion communication device, wherein the polling signal is sufficient to elicit a response from the companion communication device; and detecting the response from the companion communication device based on the transmitted polling signal.

13. The system of claim 11, wherein the communications module is configured to emit the sensing signal in response to the refraining.

14. The system of claim 1, wherein the parameter change comprises a difference in value between the present parameter and the reference parameter, the parameter change representing at least one of a decrease in load seen at an antenna of the primary communication device, an increase in power of the emitted sensing signal, a change in phase of the emitted sensing signal, and an increase in amplitude of the emitted sensing signal.

15. The system of claim 1, wherein the analysis module is configured to determine that the companion communication device is beyond the proximity of the primary communication device if the parameter change is greater than or equal to a predetermined threshold.

16. A computer-implemented method for determining whether a companion communication device is beyond a proximity of a primary communication device, the method comprising:
    determining whether a wireless transaction between the primary communication device and the companion communication device is at a conclusion;
    emitting a sensing signal based on the determination of whether the transaction is at the conclusion, the sensing signal comprising a plurality of pulses, each of the plurality of pulses having a pulse width;
    detecting a present parameter associated with the emitted sensing signal;
    determining a parameter change between the present parameter and a reference parameter; and
    determining whether the companion communication device is beyond the proximity of the primary communication device based on the parameter change.

17. The method of claim 16, further comprising maintaining emission of the sensing signal until the companion communication device is determined to be beyond the proximity of the primary communication device, the sensing signal being insufficient to power the companion communication device.

18. The method of claim 16, wherein determining whether the wireless transaction is at the conclusion comprises determining if an objective of the transaction has been completed or if the objective has failed.

19. A non-transitory machine-readable medium encoded with executable instructions for determining whether a companion near field communication (NFC) device is beyond a proximity of a primary NFC device, the instructions comprising code for:
    determining whether a wireless transaction between the primary NFC device and the companion NFC device is at a conclusion;
    emitting, via an antenna of the primary NFC device, a sensing signal if the transaction is determined to be at the conclusion;
    detecting a present parameter associated with the emitted sensing signal;
    determining a parameter change between the present parameter and a reference parameter when a response to the sensing signal is not received from the companion NFC device; and
    determining whether the companion NFC device is beyond the proximity of the primary NFC device based on the parameter change.

20. The non-transitory machine-readable medium of claim 19, wherein the parameter change comprises a difference in value between the present parameter and the reference parameter, the parameter change representing at least one of a change in load seen at the antenna, a change in power of the emitted sensing signal, a change in phase of the emitted sensing signal, or a change in amplitude of the emitted sensing signal.

21. The non-transitory machine-readable medium of claim 20, wherein determining whether the companion NFC device is beyond the proximity of the primary NFC comprises code for determining that the companion NFC device is beyond the proximity of the primary NFC device if the parameter change represents a decrease in the load of the antenna, an increase in the power of the emitted sensing signal, a change in the phase of the emitted sensing signal, or an increase in the amplitude of the emitted sensing signal.

* * * * *